US010596883B2

(12) United States Patent
Bacon

(10) Patent No.: US 10,596,883 B2
(45) Date of Patent: *Mar. 24, 2020

(54) VENT SHADE ASSEMBLY

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 163 days.

This patent is subject to a terminal disclaimer.

(21) Appl. No.: 15/634,306

(22) Filed: Jun. 27, 2017

(65) Prior Publication Data

US 2018/0370338 A1 Dec. 27, 2018

(51) Int. Cl.
*E06B 9/262* (2006.01)
*B60J 1/20* (2006.01)
*B60P 3/36* (2006.01)

(52) U.S. Cl.
CPC .......... *B60J 1/2088* (2013.01); *B60J 1/2091* (2013.01); *B60P 3/36* (2013.01)

(58) Field of Classification Search
CPC . E06B 9/58; E06B 9/262; E06B 9/327; E06B 2009/583; E06B 2009/2622; E06B 2009/2625; E06B 2009/2627; E06B 2009/015; E06B 2009/527; B60J 1/2088; B60J 1/2025; B60J 1/2044; B60J 1/2052; B60J 1/2066
USPC ... 160/84.05, 84.01, 84.04, 84.06, 277, 279, 160/33, 34, 35
See application file for complete search history.

(56) References Cited

U.S. PATENT DOCUMENTS

| 1,728,074 | A | | 9/1929 | Nicholas |
| 1,888,522 | A | * | 11/1932 | Ward ...................... E06B 7/084 49/86.1 |
| 2,637,382 | A | | 5/1953 | Nelson |

(Continued)

FOREIGN PATENT DOCUMENTS

CA      2881177 A      1/2014

OTHER PUBLICATIONS

Camco RV Vent Insulator, https://www.walmart.com/ip/Camco-RV-Vent-Insulator/16927797 (published at least on or before Mar. 25, 2017).

(Continued)

*Primary Examiner* — Johnnie A. Shablack
(74) *Attorney, Agent, or Firm* — Price Heneveld LLP

(57) ABSTRACT

A vent shade assembly for a recreational vehicle ceiling vent comprises a vent shade outer frame having an outer perimeter and an inner perimeter defining a first opening coincident with the recreational vehicle ceiling vent. A pair of shade strings are disposed on opposing sides of the vent shade outer frame and proximate the inner perimeter of the vent shade outer frame. A movable pleated shade element having a deployed shape substantially conforming to the inner perimeter of the vent shade outer frame is operable between a closed position substantially occluding the first opening of the vent shade outer frame and an open position, and the one of the pair of shade strings supports one of a pair of opposing side edges of the movable pleated shade element as the movable pleated shade element is operated between the closed position and the open position.

18 Claims, 4 Drawing Sheets

(56) References Cited

U.S. PATENT DOCUMENTS

| | | | | |
|---|---|---|---|---|
| 2,780,283 A * | 2/1957 | Wasserman | E04D 13/033 | 160/26 |
| 2,875,710 A * | 3/1959 | Bechtold | E04D 13/0354 | 52/72 |
| 3,090,613 A * | 5/1963 | Bechtold | E04D 13/0352 | 49/325 |
| 3,161,230 A * | 12/1964 | Knight | E06B 9/262 | 160/107 |
| 3,265,117 A | 8/1966 | Lorentzen et al. | | |
| 3,818,969 A * | 6/1974 | Debs | E06B 9/327 | 160/168.1 R |
| 3,924,671 A | 12/1975 | Gates | | |
| 4,202,395 A * | 5/1980 | Heck | E06B 9/262 | 160/279 |
| 4,328,853 A * | 5/1982 | Gall | E04D 13/033 | 160/183 |
| 4,369,828 A * | 1/1983 | Tatro | E06B 9/264 | 160/107 |
| 4,444,239 A * | 4/1984 | Haines | E06B 9/30 | 160/107 |
| 4,473,101 A | 9/1984 | Langeler | | |
| 4,505,070 A * | 3/1985 | Clipp | E06B 9/28 | 49/465 |
| 4,518,025 A * | 5/1985 | Judkins | E06B 9/323 | 160/168.1 R |
| 4,521,993 A | 6/1985 | Tacheny et al. | | |
| 4,552,196 A | 11/1985 | Vecchiarelli | | |
| 4,557,309 A * | 12/1985 | Judkins | E06B 9/262 | 160/279 |
| 4,557,310 A * | 12/1985 | Castellaw | A01G 9/22 | 160/84.06 |
| 4,570,393 A | 2/1986 | Minter | | |
| 4,577,619 A * | 3/1986 | Howe, Jr. | E06B 7/02 | 126/629 |
| 4,593,737 A * | 6/1986 | Clemente | E06B 9/262 | 160/84.06 |
| 4,594,821 A | 6/1986 | Bechtold et al. | | |
| 4,608,915 A | 9/1986 | Chatlos | | |
| 4,647,488 A * | 3/1987 | Schnebly | E06B 9/262 | 160/107 |
| 4,665,964 A | 5/1987 | Zommers | | |
| 4,673,018 A | 6/1987 | Judkins | | |
| 4,687,038 A * | 8/1987 | Clemente | E06B 9/262 | 160/84.06 |
| 4,726,410 A * | 2/1988 | Fresh | E05D 15/24 | 160/171 |
| 4,727,921 A * | 3/1988 | Vecchiarelli | E06B 9/388 | 160/168.1 R |
| 4,733,710 A * | 3/1988 | Haines | B60J 1/2091 | 160/107 |
| 4,739,816 A * | 4/1988 | Dodich | A01G 9/222 | 160/168.1 R |
| 4,753,281 A * | 6/1988 | Wagner | E06B 9/262 | 160/279 |
| 4,762,159 A * | 8/1988 | Ford | E06B 9/262 | 160/279 |
| 4,762,160 A * | 8/1988 | Bechtold | E04D 13/033 | 160/265 |
| 4,799,524 A * | 1/1989 | Guermonprez | E06B 9/262 | 160/115 |
| 4,825,929 A * | 5/1989 | Haines | B60J 1/2091 | 160/107 |
| 4,852,627 A * | 8/1989 | Peterson | E06B 9/262 | 160/84.02 |
| 4,917,167 A * | 4/1990 | Voss | E06B 9/262 | 160/107 |
| 4,945,969 A | 8/1990 | Schnebly | | |
| 5,141,041 A * | 8/1992 | Katz | E06B 9/262 | 160/84.02 |
| 5,195,569 A * | 3/1993 | Peterson | E06B 9/327 | 160/84.06 |
| RE34,287 E | 6/1993 | Berner et al. | | |
| 5,309,972 A * | 5/1994 | Thomas | B60H 1/262 | 160/104 |
| 5,351,737 A * | 10/1994 | Hoshiyama | E06B 9/262 | 160/84.03 |
| 5,377,737 A * | 1/1995 | Moriya | E05F 1/025 | 160/190 |
| 5,535,806 A * | 7/1996 | Kold | E06B 9/40 | 160/273.1 |
| 5,555,683 A * | 9/1996 | Schroeder | E04D 13/0358 | 52/200 |
| 5,699,845 A * | 12/1997 | Jelic | E06B 9/264 | 160/107 |
| 5,937,929 A * | 8/1999 | Chen | B60J 1/2091 | 160/370.23 |
| 6,119,755 A | 9/2000 | Oskam | | |
| 6,276,425 B1 | 8/2001 | Mauser et al. | | |
| 6,279,641 B1 | 8/2001 | Malott | | |
| 6,328,090 B1 * | 12/2001 | Anderson | E06B 7/30 | 160/107 |
| 6,338,378 B1 * | 1/2002 | Kold | E06B 9/327 | 160/279 |
| 6,427,409 B2 * | 8/2002 | Colson | E04B 9/00 | 160/84.05 |
| 6,481,486 B1 * | 11/2002 | Sanz | B64C 1/1484 | 160/107 |
| 6,560,941 B1 * | 5/2003 | French | E06B 7/08 | 52/473 |
| 6,601,633 B2 * | 8/2003 | Sun | E06B 9/264 | 160/107 |
| 6,607,020 B1 * | 8/2003 | Jensen | E04D 13/033 | 160/172 R |
| 6,758,255 B2 * | 7/2004 | Sanz | B64C 1/1484 | 160/107 |
| 6,918,216 B2 * | 7/2005 | Hoy | E04D 13/03 | 359/591 |
| 6,932,139 B2 * | 8/2005 | Early | E06B 9/264 | 160/107 |
| 7,216,687 B2 | 5/2007 | Franssen | | |
| 7,624,547 B1 * | 12/2009 | Brinton | E04D 13/0305 | 52/198 |
| 7,882,664 B2 * | 2/2011 | Lundsgaard | E04D 13/031 | 52/200 |
| 7,891,398 B2 * | 2/2011 | Chino | E06B 9/52 | 160/84.04 |
| 8,312,684 B2 * | 11/2012 | Gazaway | E06B 5/12 | 160/172 R |
| 8,950,460 B2 | 2/2015 | Worthman et al. | | |
| 9,103,156 B1 * | 8/2015 | Vassilev | E06B 9/264 | |
| 9,533,558 B2 | 1/2017 | Suh | | |
| 2003/0085001 A1 * | 5/2003 | Sanz | B64C 1/1484 | 160/84.04 |
| 2004/0159410 A1 * | 8/2004 | Welfonder | E06B 9/322 | 160/84.06 |
| 2004/0188037 A1 | 9/2004 | Schlater et al. | | |
| 2005/0028944 A1 * | 2/2005 | Early | E06B 9/264 | 160/107 |
| 2005/0101456 A1 * | 5/2005 | Maria Franssen | E06B 9/262 | 482/121 |
| 2005/0173077 A1 * | 8/2005 | Nicolosi | E06B 9/264 | 160/84.02 |
| 2006/0231220 A1 | 10/2006 | Huang | | |
| 2007/0144684 A1 * | 6/2007 | Hutchings | E06B 7/30 | 160/107 |
| 2007/0267152 A1 * | 11/2007 | Fan | E06B 9/262 | 160/84.06 |
| 2008/0148638 A1 * | 6/2008 | Knowles | B60J 1/2025 | 49/70 |
| 2009/0071087 A1 | 3/2009 | Achen | | |
| 2009/0205787 A1 * | 8/2009 | Allsopp | E06B 9/264 | 160/84.01 |
| 2009/0242141 A1 * | 10/2009 | Trotta | E06B 9/262 | 160/84.02 |
| 2011/0005690 A1 * | 1/2011 | Harding | E06B 9/262 | 160/84.03 |
| 2011/0108208 A1 * | 5/2011 | Knowles | E06B 9/327 | 160/123 |

(56) References Cited

U.S. PATENT DOCUMENTS

| | | | | |
|---|---|---|---|---|
| 2011/0192091 A1* | 8/2011 | Smith | ...................... | B60J 1/007 49/490.1 |
| 2012/0061031 A1* | 3/2012 | Zhang | .................... | E06B 9/264 160/107 |
| 2014/0048219 A1* | 2/2014 | Knowles | ................ | E06B 9/262 160/331 |
| 2014/0138036 A1* | 5/2014 | de Vries | ................ | E06B 9/307 160/176.1 R |
| 2015/0218881 A1* | 8/2015 | Cheringal | ................ | E06B 9/38 160/84.06 |
| 2015/0225996 A1* | 8/2015 | Maksan | .................. | E06B 9/327 160/107 |
| 2015/0275571 A1* | 10/2015 | Guhl | ....................... | E06B 9/327 160/172 R |
| 2015/0352924 A1* | 12/2015 | Allard | ................ | B60H 1/00364 454/94 |
| 2015/0368962 A1 | 12/2015 | Motosko et al. | | |
| 2016/0229514 A1* | 8/2016 | Mohat | ...................... | A47H 1/00 |
| 2016/0348426 A1* | 12/2016 | Glavas | .................... | E06B 9/262 |
| 2017/0008379 A1* | 1/2017 | Gennissen | ............. | B60J 1/2066 |
| 2017/0216756 A1* | 8/2017 | Fox | ......................... | B01D 46/10 |
| 2017/0267071 A1 | 9/2017 | McKinnon | | |
| 2017/0350133 A1* | 12/2017 | Chung | .................... | E04F 10/02 |
| 2018/0258691 A1 | 9/2018 | Baggett et al. | | |
| 2018/0370338 A1* | 12/2018 | Bacon | .................... | B60J 1/2088 |
| 2018/0370339 A1* | 12/2018 | Bacon | .................... | B60J 1/2088 |

OTHER PUBLICATIONS

Camco 42913 Retractable Lights Out Vent Shade, https://www.amazon.com/Camco-42913-Retractable-Lights-Shade/dp/B000EDUTW2 (published at least on or before Mar. 25, 2017).

Rick Kessler, "'Slim Shade' by AP Products is Gaining Traction," RV Business, http://www.rvbusiness.com, Nov. 21, 2016.

AP Products Catalog, Coldwater, Michigan (2017).

* cited by examiner

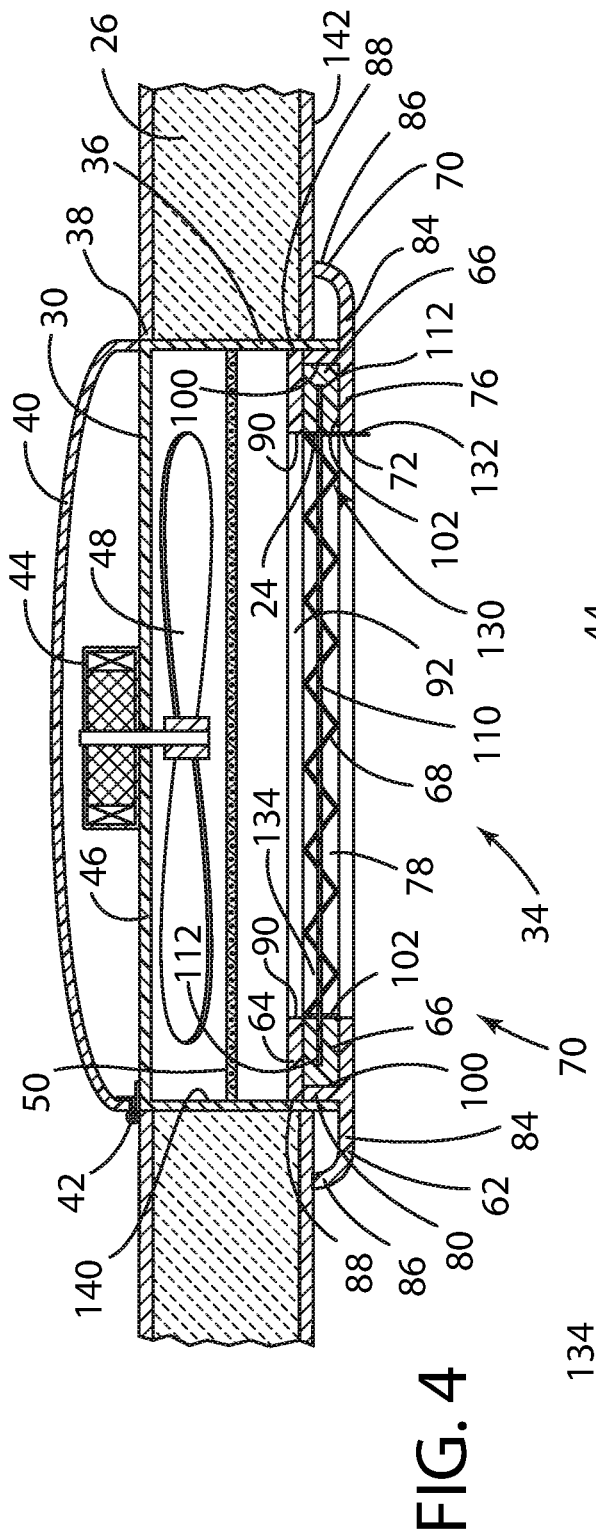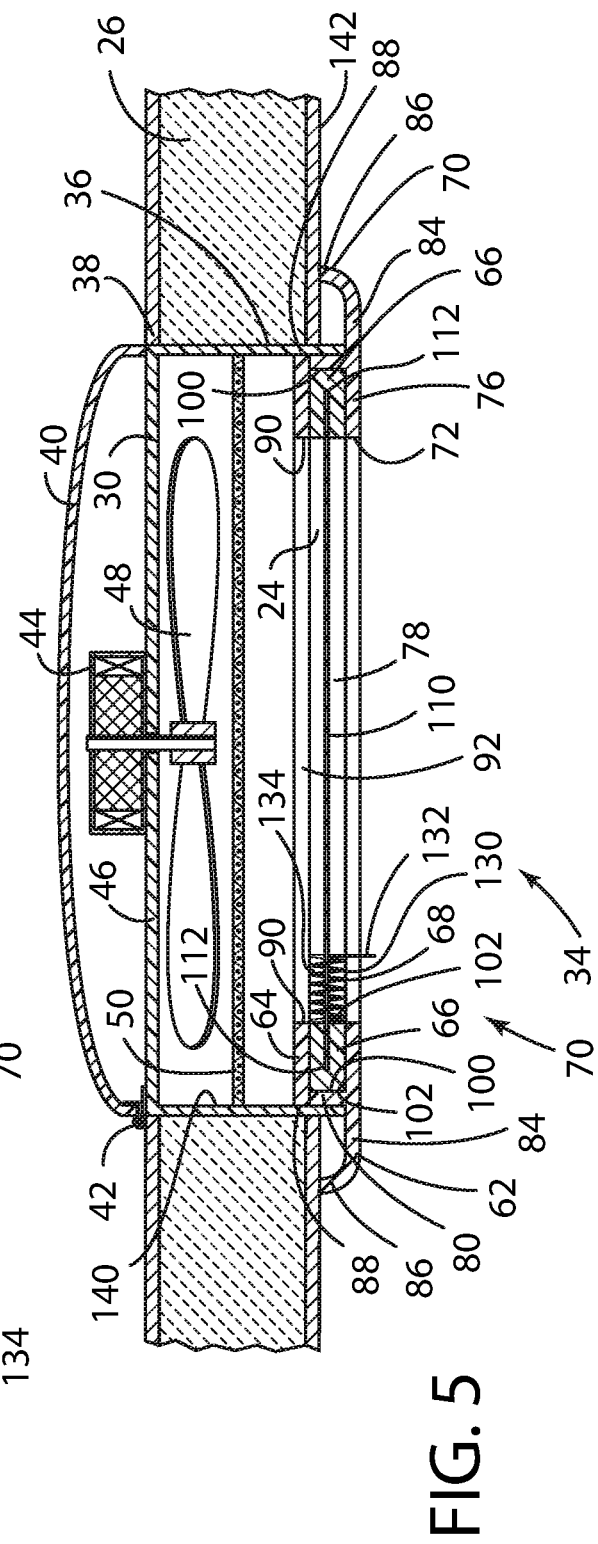

VENT SHADE ASSEMBLY

FIELD OF THE INVENTION

The present invention generally relates to an assembly providing a moveable shade for ceiling vents for use in recreational vehicles and, more particularly, a pleated moveable shade assembly for a recreational vehicle ceiling vent that is supported along its edges by a pair of parallel shade strings supported at opposite ends by a pair of opposing string guides.

BACKGROUND OF THE INVENTION

Modern recreational vehicles, such as motor coaches and travel trailers, often employ one or more ceiling vents mounted in one or more openings provided in the roof portion of the body of the recreational vehicle. Such ceiling vents are primarily designed to allow light in to assist in illuminating the interior of the body of the recreational vehicle. Many designs of such ceiling vents may also be opened to allow fresh air into and odors out of the interior of the body of the recreational vehicle. However, in the event that the recreational vehicle occupant wishes a darker environment, such as for sleeping, such ceiling vents present the problem of unwanted illumination. Further, in the event of relatively cold or relatively hot exterior ambient temperatures, such ceiling vents do not provide effective insulation. An improved vent shade assembly for a recreational vehicle ceiling vent, particularly a vent shade assembly that may be retrofitted to existing ceiling vents, that provides effective light control and increased insulative properties is desired.

SUMMARY OF THE INVENTION

According to one aspect of the present disclosure, a vent shade assembly for a recreational vehicle ceiling vent comprises a vent shade outer frame having an outer perimeter and an inner perimeter defining a first opening coincident with the recreational vehicle ceiling vent. A pair of shade strings are disposed on opposing sides of the vent shade outer frame and proximate the inner perimeter of the vent shade outer frame. A movable pleated shade element having a deployed shape substantially conforming to the inner perimeter of the vent shade outer frame is operable between a closed position substantially occluding the first opening of the vent shade outer frame and an open position. One of the pair of shade strings supports one of a pair of opposing side edges of the movable pleated shade element as the movable pleated shade element is operated between the closed position and the open position.

According to another aspect of the present disclosure, a vent shade assembly for a recreational vehicle ceiling vent comprises a substantially rectangular vent shade outer frame having an outer perimeter, an inner perimeter defining a first opening coincident with the recreational vehicle ceiling vent, and an inner lip defining the inner perimeter thereof, and a substantially rectangular vent shade inner frame having an outer perimeter and an inner perimeter defining a second opening coincident with the recreational vehicle ceiling vent. A pair of opposing string guides is restrained between the inner lip of the vent shade outer frame and the vent shade inner frame. One of a pair of shade strings is disposed proximate an opposing side of the vent shade outer frame, proximate the inner perimeter of the vent shade outer frame and orthogonally to the pair of opposing string guides, each of the pair of shade strings extending between the pair of opposing string guides. A movable pleated shade element has a deployed shape substantially conforming to the inner perimeter of the vent shade outer frame, wherein the movable pleated shade element is operable between a closed position substantially occluding the first opening of the vent shade outer frame and an open position, and the one of the pair of shade strings supports a one of a pair of opposing side edges of the movable pleated shade element as the movable pleated shade element is operated between the closed position and the open position.

According to a further aspect of the present disclosure, a vent shade assembly for a recreational vehicle ceiling vent comprises a substantially rectangular vent shade outer frame having an outer perimeter, an inner perimeter defining a first opening coincident with the recreational vehicle ceiling vent, an inner lip defining the inner perimeter thereof, and an inner flange disposed about the inner perimeter of the vent shade outer frame, the inner flange further comprising a pair of opposed braces disposed proximate the inner perimeter of the vent shade outer frame, and a substantially rectangular vent shade inner frame having an outer perimeter and an inner perimeter defining a second opening coincident with the recreational vehicle ceiling vent. A pair of opposing string guides is restrained between the vent shade inner frame and the inner lip of the vent shade outer frame, the pair of opposing string guides disposed and in juxtaposed relation with an inner surface of a one of the pair of opposed braces. One of a pair of shade strings is disposed on opposing sides of the vent shade outer frame, proximate the inner perimeter of the vent shade outer frame, and orthogonally to the pair of opposing string guides, each of the pair of shade strings extending between the pair of opposing string guides. A movable pleated shade element having a deployed shape substantially conforming to the inner perimeter of the vent shade outer frame is operable between a closed position substantially occluding the first opening of the vent shade outer frame and an open position, and the one of the pair of shade strings extends through a one of a pair of rows of evenly disposed openings disposed along each of the pair of opposing side edges of the movable pleated shade element as the movable pleated shade element is operated between the closed position and the open position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a side cross-sectional view of an assembled vent shade assembly of FIG. 2 in accordance with the present disclosure installed in one of the ceiling vents of the recreational vehicle of FIG. 1, wherein the movable pleated shade element is in the closed position; and FIG. 5 is a side cross-sectional view of an assembled vent shade assembly of FIG. 2 in accordance with the present disclosure installed in one of the ceiling vents of the recreational vehicle of FIG. 1, wherein the movable pleated shade element is in the open position.

DETAILED DESCRIPTION OF THE PREFERRED EMBODIMENTS

Figure 2:
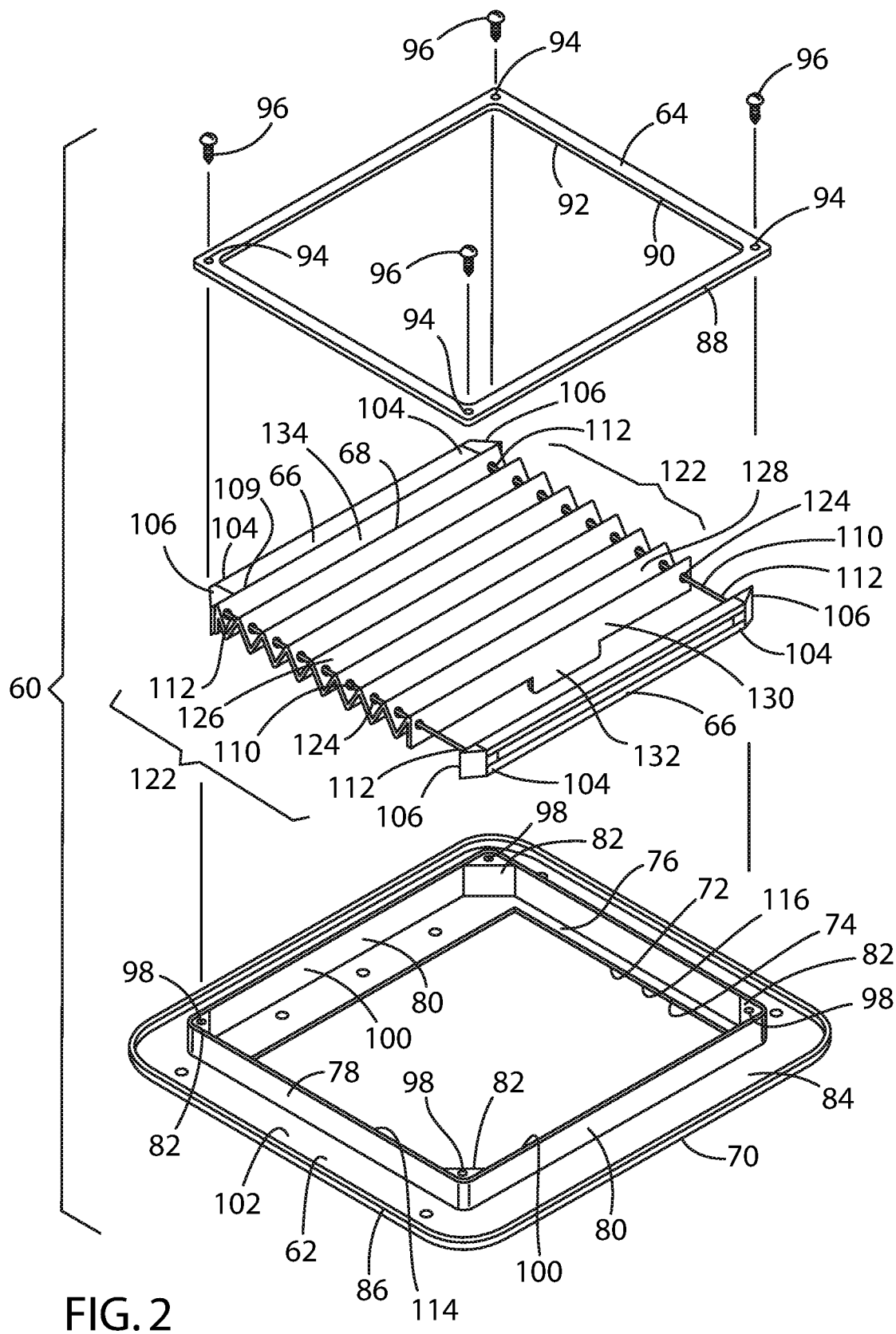
FIG. 2 is an exploded top side perspective view of a vent shade assembly in accordance with the present disclosure adapted for installation to one or more of the ceiling vents of the recreational vehicle of FIG. 1.

For purposes of description herein, the terms "upper," "lower," "right," "left," "rear," "front," "vertical," "horizontal," "interior," "exterior," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
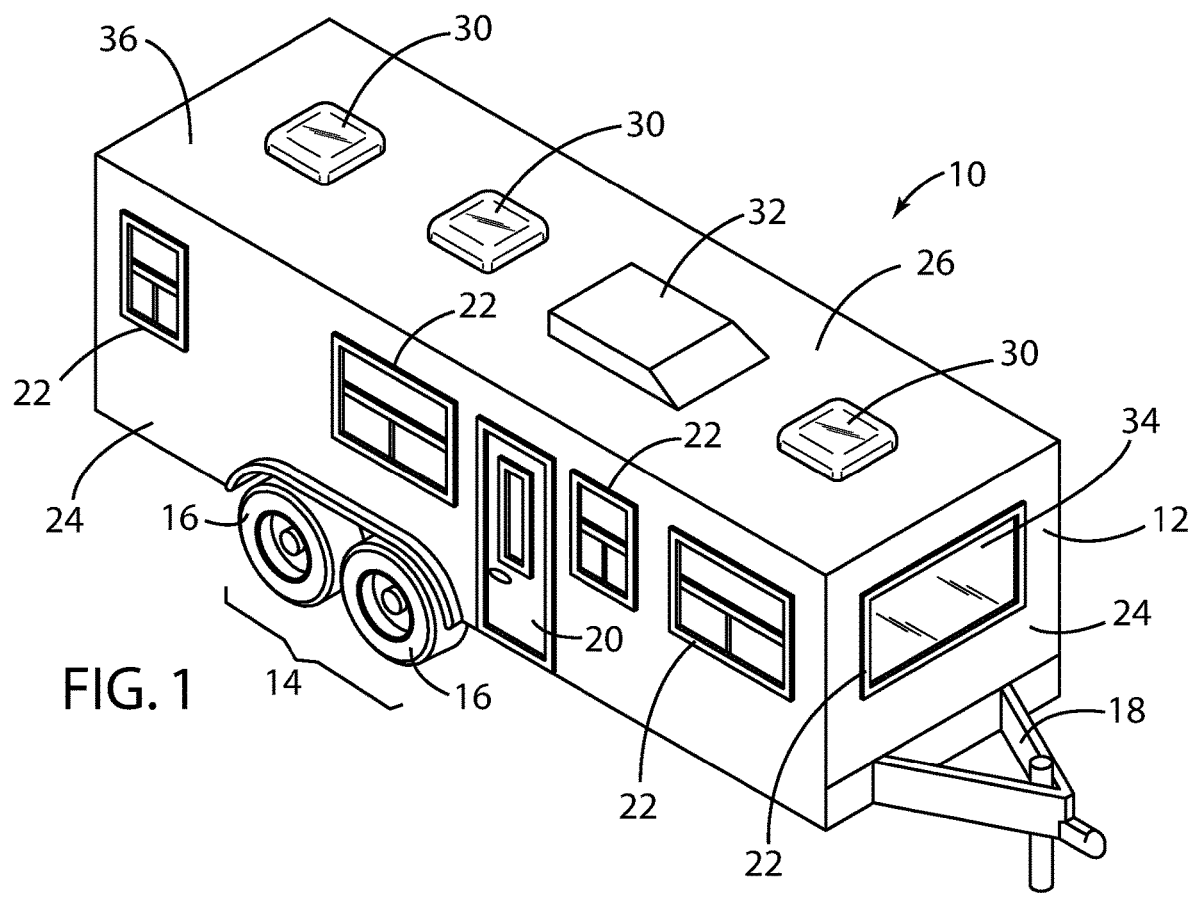
FIG. 1 is a front side perspective view of a recreational vehicle provided with a plurality of ceiling vents on a roof portion thereof.

Referring to FIG. 1, reference numeral 10 generally designates a recreational vehicle travel trailer particularly adapted for being towed by a motor vehicle (not shown). However, other recreational vehicle 10 configurations may advantageously employ the benefits of the present disclosure, such as and including motor coaches and so-called fifth-wheeled travel trailers. In the embodiment contemplated herein, the recreational vehicle 10 generally comprises a body 12 that is primarily supported by a pair of axles 14, each comprising at least one pair of opposing road wheels and an axle assembly 16, and a trailer tongue 18 by which the recreational vehicle 10 be attached to the tow vehicle. As is typical, the recreational vehicle 10 has a door 20 for ingress and egress and a plurality of windows 22 arranged on side walls 24 of the body 12. A roof portion 26 is provided to enclose the body 12 and typically includes one or more ceiling vents 30, typically arranged along the longitudinal length of the recreational vehicle 10. Optionally, an air conditioning unit 32 can be mounted on the roof portion 26 as well.

The ceiling vents 30 to which the present disclosure may be applied are primarily installed to provide light and ventilation to the interior 34 of the body 12 of the recreational vehicle 10. That is, each ceiling vent 30 is typically operable between a closed position, in which the elements are maintained outside of the interior 34 of the body 12 of the recreational vehicle 10, and an open position, by which fresh air may be introduced into the interior 34 of the body 12 of the recreational vehicle 10. As shown in FIGS. 4 and 5, the ceiling vent 30 generally comprises a body portion 36, preferably in sealed relation within an opening 38 in the roof portion 26 of the recreational vehicle 10, and an upper dome 40. The upper dome 40 of the ceiling vent 30 may be movable about a hinge 42 between the closed position and the open position, and is typically constructed of a clear transparent material, such as glass or, more commonly, clear or tinted polycarbonate. When in the open position, a fan motor 44 supported by an open frame 46 may preferably be actuated to operate a fan 48 to exhaust air from the interior 34 of the body 12 of the recreational vehicle 10 and thereby cool the interior 34 of the body 12 of the recreational vehicle 10, as is known. A screen 50 may also be disposed below the fan 48 to prevent interaction of any object within the interior 34 of the body 12 of the recreational vehicle 10 with the fan 48, and allow air to pass through the ceiling vent 30.

As shown in FIG. 2, the vent shade assembly 60 according to the present disclosure generally includes a vent shade outer frame 62, a vent shade inner frame 64, a pair of opposing string guides 66 restrained between the vent shade inner frame 64 and the vent shade outer frame 62, and a movable pleated shade element 68 operable between a closed position and an open position.

Figure 3:
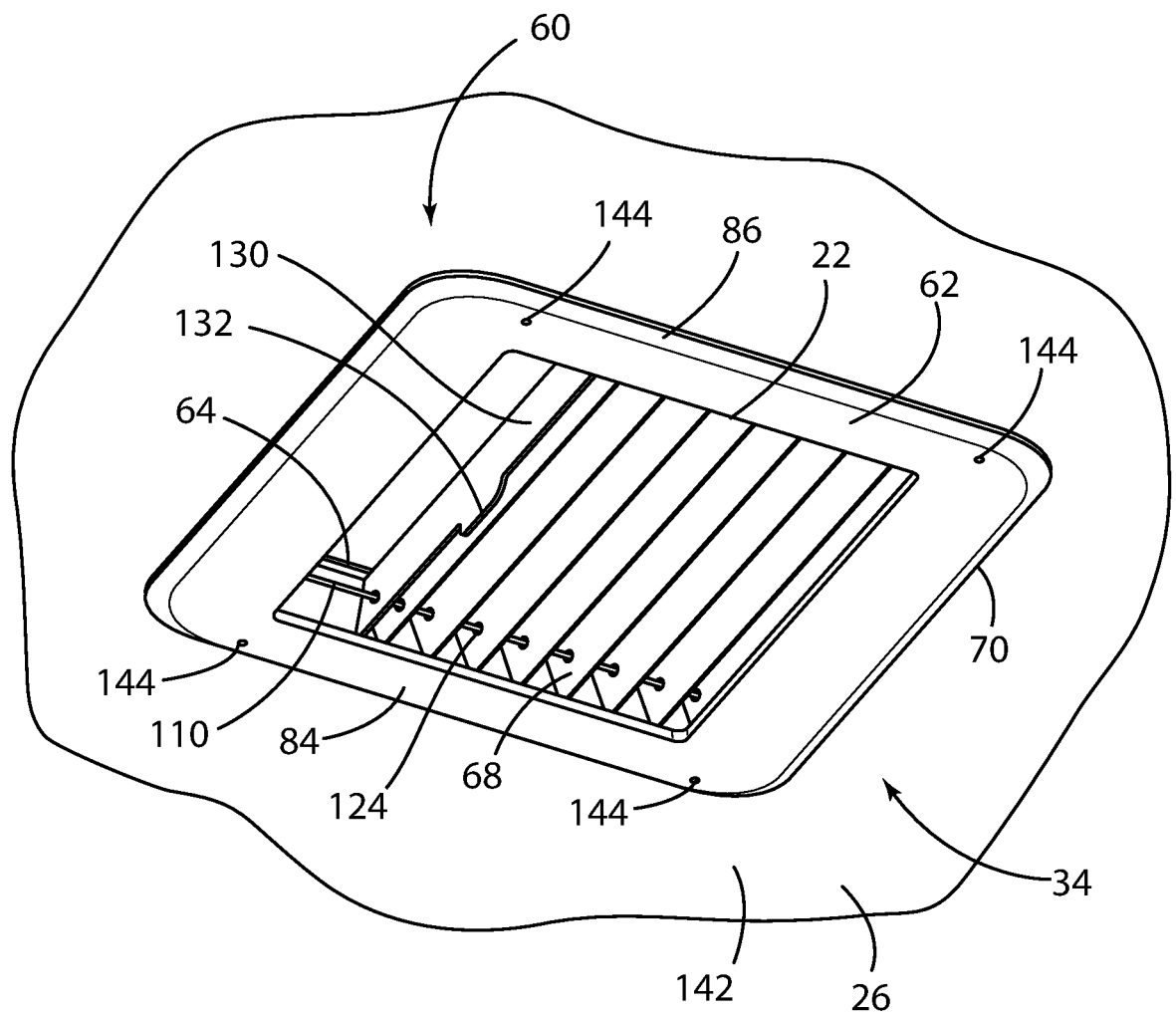
FIG. 3 is a bottom side perspective view of an assembled vent shade assembly of FIG. 2 in accordance with the present disclosure installed in one of the ceiling vents of the recreational vehicle of FIG. 1.

As best shown in FIGS. 2 and 3, the vent shade outer frame 62 has a substantially rectangular configuration having an outer perimeter 70 and an inner perimeter 72. The inner perimeter 72 of the vent shade outer frame 62 defines a first opening 74 coincident with the recreational vehicle ceiling vent 30, as shown in FIGS. 4 and 5. An inner lip 76 defines the inner perimeter 72 of the vent shade outer frame 62, and an inner flange 78 is disposed substantially about the inner perimeter 72 of the vent shade outer frame 62 at a predetermined distance from the edge of the inner lip 76 defining the inner perimeter 72. Preferably, the inner lip 76 and the inner flange 78 may also have a rectangular configuration that substantially corresponds with the overall rectangular configuration of the vent shade outer frame 62. The inner flange 78 is preferably disposed perpendicularly to the plane of the vent shade outer frame 62 and also preferably includes a pair of opposed braces 80 disposed proximate the inner perimeter 72 of the vent shade outer frame 62, as further discussed below. As shown in FIG. 2, a triangular boss 82 may be integrated into each corner of the inner flange 78 to which the vent shade inner frame 64 may be mounted, as further described below.

The vent shade outer frame 62 may also include an outer lip 84 defining the outer perimeter 70 thereof. Preferably, the outer lip 84 forms an outer flange 86 having a configuration substantially corresponding to the inner flange 78 about the outer perimeter 70 of the vent shade outer frame 62. Preferably, the outer lip 84 and the outer flange 86 may also have a rectangular configuration that substantially corresponds with the rectangular configuration of the vent shade outer frame 62. The vent shade outer frame 62 is preferably economically manufactured from polystyrene polymer materials and can be tinted to match the color of the interior 34 of the body 12 of the recreational vehicle 10, as may be desired.

The vent shade inner frame 64 likewise has a substantially rectangular configuration having an outer perimeter 88 and an inner perimeter 90. The inner perimeter 90 of the vent shade inner frame 64 defines a second opening 92 coincident with the recreational vehicle ceiling vent 30, as shown in FIGS. 4 and 5. Preferably, the vent shade inner frame 64 may also have a rectangular configuration that substantially corresponds with the rectangular configuration of the vent shade outer frame 62. In particular, as shown in FIG. 2, the outer perimeter 88 of the vent shade inner frame 64 preferably is configured to substantially correspond with the inner flange 78 of the vent shade outer frame 62.

An opening 94 may be disposed on each corner of the vent shade inner frame 64 through which a fastener 96 may be inserted and attached to a corresponding opening 98 in each of the triangular bosses 82 disposed at each interior corner of the inner flange 78 in order to effectuate a mechanical attachment of the vent shade inner frame 64 to the vent shade outer frame 62. Alternatively, each corner of the vent shade inner frame 64 may be heat staked to the vent shade outer frame 62 at a plurality of locations about the inner perimeter 90, 72 of each of the vent shade inner frame 64 and the vent shade outer frame 62, respectively, such as at each of the triangular bosses 82 disposed at each interior corner of the inner flange 78. The vent shade inner frame 64 is also preferably economically manufactured from polystyrene polymer materials and can be tinted to match the color of the interior of the body 12 of the recreational vehicle 10, as may be desired.

As shown in FIGS. 2, 4, and 5, the pair of opposing string guides 66 is restrained between the inner lip 76 of the vent shade outer frame 62 and vent shade inner frame 64. As perhaps best shown in the FIGS. 4 and 5, each of the pair of opposing string guides 66 is disposed and is in juxtaposed relation with an inner surface 100 of each of the pair of opposed braces 80. Each of the pair of opposing string guides 66 is preferably attached to the upper surface 102 of the inner lip 76 of the vent shade outer frame 62, preferably via a heat staking process. The distal ends 104 of each of the pair of opposing string guides 66 preferably includes a triangular shaped end cap 106 that is fittingly received proximate the triangular bosses 82 disposed at each corner of the inner flange 78. The end cap 106 may be either a separate component fixedly attached to the opposing string guides 66, as shown, or may be integrally formed with the distal end 104 of each of the pair of opposing string guides 66.

A pair of shade strings 110 is preferably supported at a pair of opposing terminal ends 112 thereof by the end caps 106 provided on the pair of opposing string guides 66, as shown in FIG. 2. Preferably, one of the pair of shade strings 110 is each disposed on opposing sides 114, 116 of the vent shade outer frame 62, proximate the inner perimeter 72 of the vent shade outer frame 62 and orthogonally to the pair of opposing string guides 66, each of the pair of shade strings 110 extending between the pair of opposing string guides 66.

The movable pleated shade element 68 is preferably disposed horizontally and movably within the inner flange 78 of the vent shade outer frame 62. The movable pleated shade element 68 preferably has a deployed shape substantially conforming to the inner perimeter 72 and inner flange 78 of the vent shade outer frame 62, wherein the movable pleated shade element 68 is operable between a closed position and an open position. When in the closed position, the movable pleated shade element 68 preferably substantially occludes the first opening 74 of the vent shade outer frame 62, thereby preventing light from passing through the vent shade assembly 60.

The movable pleated shade element 68 is supported by the pair of shade strings 110 that each extends through one of a pair of rows 122 of openings 124 disposed along each of a pair of opposing side edges 126, 128 of the movable pleated shade element 68. The movable pleated shade element 68 is operable between the closed position and the open position. Preferably, one of the pair of shade strings 110 extends through a one of the pair of rows 122 of evenly disposed openings 124 along each of the pair of opposing side edges 126, 128 of the movable pleated shade element 68, as best shown in FIG. 2.

The pair of opposing string guides 66 is preferably arranged in orthogonal relation to the pair of opposing side edges 126, 128 of the movable pleated shade element 68. The pair of shade strings 110 and the pair of opposing side edges 126, 128 of the movable pleated shade element 68 are thus arranged in parallel relation one to the other.

In the preferred embodiment of the present disclosure, the movable pleated shade element 68 is fabricated from an opaque material. In particular, even more preferably, the movable pleated shade element 68 may be fabricated from a pleated flexible fabric material with a BoPET (Biaxially-oriented polyethylene terephthalate) backing, of the type sold under the brand name Mylar®. However, it is further contemplated that the movable pleated shade element 68 may be fabricated from a translucent material in order to provide softer environmental illumination within the interior 34 of the body 12 of the recreational vehicle 10.

As shown in the Figures, the movable pleated shade element 68 is fabricated as a single layer pleated shade element 68. However, it is contemplated that the movable pleated shade element 68 may also be fabricated as a honeycomb cellular pleated shade element 68 having one or more rows of cellular chambers. In either case, the leading edge 130 of the movable pleated shade element 68 may be manipulated by a vertically depending handle portion 132 between the open and the closed positions, wherein in the closed position, shown in FIG. 4, the leading edge 130 of the movable pleated shade element 68 is brought into juxtaposed relation with one of the of opposing string guides 66. Further, it is contemplated that a fastening device (not shown), such as cooperating magnets, could be provided on each of the depending handle portions 132 and the one of the pair of opposing string guides 66 to provide a secure closure of the vent shade assembly 60 and may thereby more reliably prevent light from shining through the vent shade assembly 60 when the moveable pleated shade element 68 is in the closed position. An opposing trailing edge 134 of the movable pleated shade element 68 is preferably fixedly attached to the other of the pair of opposing string guides 66 and thereby held in place within the overall vent shade assembly 60.

When installed, as shown in FIGS. 4 and 5, the vent shade assembly 60 of the present disclosure is preferably received within a recess 140 of the ceiling vent 30 relative a lower surface 142 of the roof portion 26 of the body 12 of the recreational vehicle 10. Preferably, the outer lip 84 of the vent shade outer frame 62 that forms the outer perimeter 70 of the vent shade outer frame 62 is provided with a plurality of openings 144 at each corner thereof proximate the outer perimeter 70 by which the vent shade assembly 60 may be attached by a fastener (not shown) to the lower surface 142 of the roof portion 26 of the body 12 of the recreational vehicle 10.

The vent shade assembly 60 of the present disclosure thus creates a self-contained vent shade assembly 60 that may be adapted to fit over the interior facing portions of existing ceiling vents 30 previously installed in manufactured recreational vehicles 10. Alternatively, the vent shade assembly 60 of the present disclosure can be custom-designed to specific ceiling vents 30 and installed by the original equipment manufacturer of the recreational vehicle 10.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components.

Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vent shade assembly for a recreational vehicle ceiling vent, the vent shade assembly comprising:
   a vent shade outer frame having an outer perimeter and an inner perimeter defining a first opening, wherein the outer perimeter of the vent shade outer frame includes an outer flange and has a configuration substantially corresponding to the inner perimeter of the vent shade outer frame;
   a vent shade inner frame having an outer perimeter and an inner perimeter defining a second opening coincident with the first opening, wherein the outer perimeter of the vent shade inner frame is smaller than the outer perimeter of the vent shade outer frame and larger than the inner perimeter of the vent shade outer frame;
   a pair of shade strings, wherein each of the pair of shade strings is disposed on a one of a pair of opposing sides of the vent shade outer frame and proximate the inner perimeter of the vent shade outer frame; and
   a movable pleated shade element having a deployed shape substantially conforming to the inner perimeter of the vent shade outer frame, wherein the movable pleated shade element is operable between a closed position substantially occluding the first opening of the vent shade outer frame and an open position, and the one of the pair of shade strings supports a one of a pair of opposing side edges of the movable pleated shade element as the movable pleated shade element is operated between the closed position and the open position;
   wherein each of the pair of shade strings is supported at a pair of opposing terminal ends thereof by a pair of opposing string guides, and the pair of shade strings and the pair of opposing side edges of the movable pleated shade element are arranged in parallel relation one to the other; and
   wherein the vent shade outer frame comprises a pair of opposed braces disposed proximate the inner perimeter of the vent shade outer frame and each of the pair of opposing string guides are disposed and in juxtaposed relation with an inner surface of a one of the pair of opposed braces.

2. The vent shade assembly of claim 1, wherein each of the inner perimeter of the vent shade outer frame and the inner perimeter of the vent shade inner frame have substantially the same shape and size.

3. The vent shade assembly of claim 1, wherein the pair of opposing string guides is arranged in orthogonal relation to the pair of shade strings and the pair of opposing side edges of the movable pleated shade element.

4. The vent shade assembly of claim 1, wherein the movable pleated shade element comprises a translucent material.

5. The vent shade assembly of claim 1, wherein the vent shade outer frame comprises an inner flange disposed about the inner perimeter of the vent shade outer frame, the inner flange further comprising the pair of opposed braces.

6. The vent shade assembly of claim 5, wherein the outer perimeter of the vent shade inner frame substantially corresponds with the inner flange of the vent shade outer frame and the vent shade outer frame further comprises an inner lip defining the inner perimeter thereof, and wherein the pair of opposing string guides is restrained between the vent shade inner frame and the inner lip of the vent shade outer frame.

7. The vent shade assembly of claim 6, wherein the vent shade inner frame is mechanically attached to the vent shade outer frame.

8. The vent shade assembly of claim 7, wherein the vent shade inner frame is heat staked to the vent shade outer frame at a plurality of locations about the inner perimeter of each of the vent shade inner frame and the vent shade outer frame.

9. The vent shade assembly of claim 6, wherein the outer perimeter and the inner perimeter of each of the vent shade outer frame and the vent shade inner frame form a substantially rectangular shape.

10. The vent shade assembly of claim 5, wherein the vent shade outer frame further comprises an outer lip defining the outer perimeter thereof, and wherein the outer lip forms the outer flange.

11. The vent shade assembly of claim 1, wherein the movable pleated shade element comprises an opaque material.

12. The vent shade assembly of claim 11, wherein the movable pleated shade element comprises a pleated fabric material with an opaque polymeric backing.

13. The vent shade assembly of claim 11, wherein the movable pleated shade element comprises a single layer pleated shade element.

14. The vent shade assembly of claim 11, wherein the movable pleated shade element comprises a honeycomb cellular pleated shade element having one or more rows of cellular chambers.

15. A vent shade assembly for a recreational vehicle ceiling vent comprising:
   a substantially rectangular vent shade outer frame having an outer perimeter, an inner perimeter defining a first opening, and an inner lip defining the inner perimeter thereof;
   a substantially rectangular vent shade inner frame having an outer perimeter and an inner perimeter defining a second opening coincident with the first opening, wherein the outer perimeter of the vent shade inner frame is smaller than the outer perimeter of the vent shade outer frame inner perimeter of the vent shade inner frame substantially corresponds with the inner perimeter of the vent shade outer frame;
   a pair of opposing string guides restrained between the inner lip of the vent shade outer frame and the vent shade inner frame;
   one of a pair of shade strings each disposed proximate a one of a pair of opposing sides of the vent shade outer frame, proximate the inner perimeter of the vent shade outer frame and orthogonally to the pair of opposing string guides, each of the pair of shade strings extending between the pair of opposing string guides; and
   a movable pleated shade element having a deployed shape substantially conforming to the inner perimeter of the vent shade outer frame, wherein the movable pleated shade element is operable between a closed position substantially occluding the first opening of the vent shade outer frame and an open position, and the one of the pair of shade strings supports a one of a pair of opposing side edges of the movable pleated shade element as the movable pleated shade element is operated between the closed position and the open position.

16. The vent shade assembly of claim 15, wherein the movable pleated shade element comprises a pair of rows having a plurality of evenly disposed openings along each of the pair of opposing side edges, wherein the one of the pair of shade strings extends through a one of the pair of rows of evenly disposed openings along each of the pair of opposing side edges of the movable pleated shade element.

17. A vent shade assembly for a recreational vehicle ceiling vent comprising:
   a substantially rectangular vent shade outer frame having an outer perimeter, an inner perimeter defining a first opening, an inner lip defining the inner perimeter thereof, and an inner flange disposed about the inner perimeter of the vent shade outer frame, the inner flange further comprising a pair of opposed braces disposed proximate the inner perimeter of the vent shade outer frame;
   a substantially rectangular vent shade inner frame having an outer perimeter and an inner perimeter defining a second opening coincident with the first opening, wherein the outer perimeter of the vent shade inner frame is smaller than the outer perimeter of the vent shade outer frame and the inner perimeter of the vent shade inner frame-substantially corresponds with the inner perimeter of the vent shade outer frame, such that the each of the inner perimeter of the vent shade outer frame and the inner perimeter of the vent shade inner frame have substantially the same shape and size;
   a pair of opposing string guides restrained between the vent shade inner frame and the inner lip of the vent shade outer frame, the pair of opposing string guides disposed and in juxtaposed relation with an inner surface of a one of the pair of opposed braces;
   one of a pair of shade strings each disposed on opposing sides of the vent shade outer frame, proximate the inner perimeter of the vent shade outer frame, and orthogonally to the pair of opposing string guides, each of the pair of shade strings extending between the pair of opposing string guides; and
   a movable pleated shade element having a deployed shape substantially conforming to the inner perimeter of the vent shade outer frame, wherein the movable pleated shade element is operable between a closed position substantially occluding the first opening of the vent shade outer frame and an open position, and the one of the pair of shade strings extends through a one of a pair of rows of evenly disposed openings disposed along each of a pair of opposing side edges of the movable pleated shade element as the movable pleated shade element is operated between the closed position and the open position.

18. The vent shade assembly of claim 17, wherein the pair of shade strings and the pair of opposing side edges of the movable pleated shade element are arranged in parallel relation one to the other.

* * * * *